Figure 1:
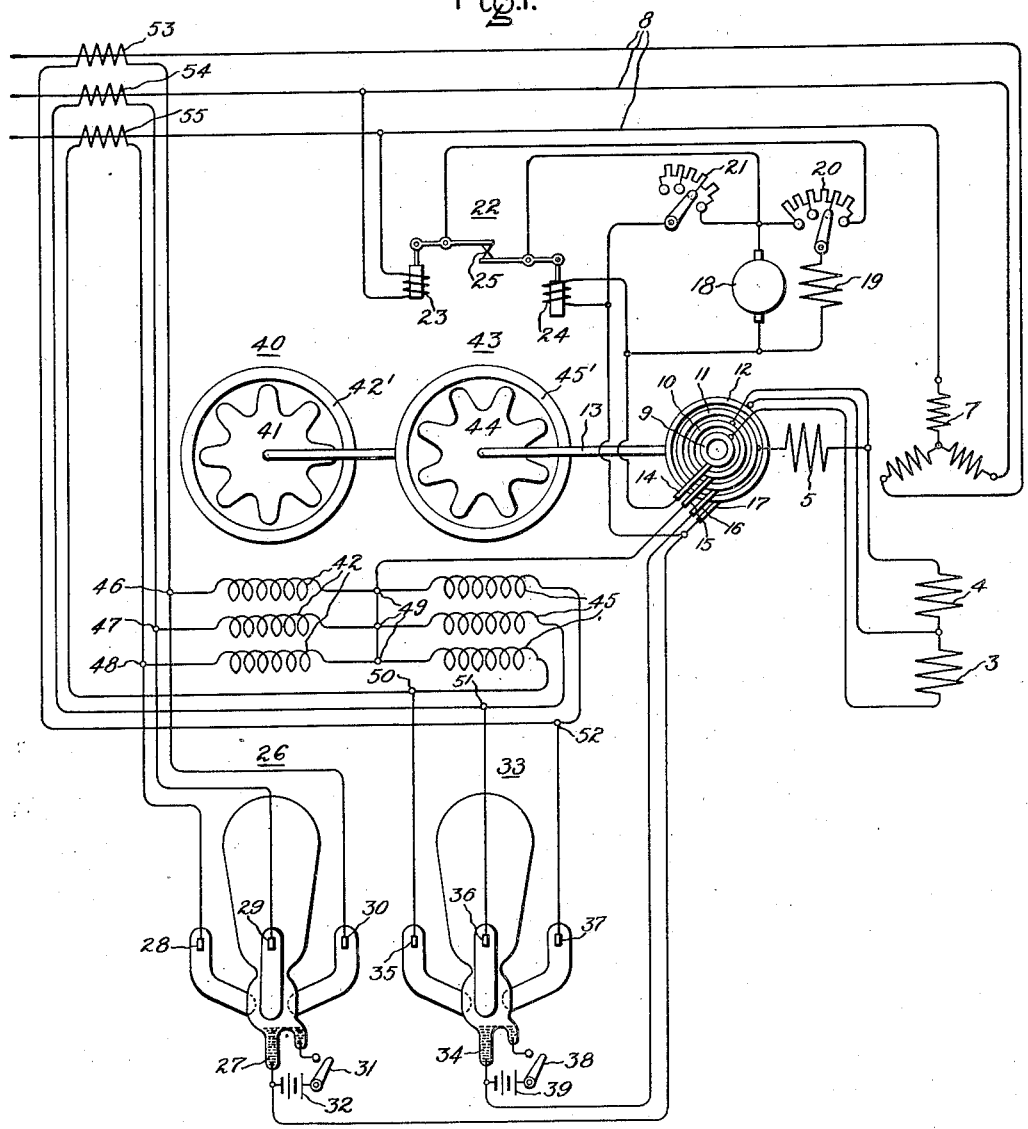

Oct. 25, 1927.

V. KARAPETOFF 1,646,823

REGULATION OF DYNAMO ELECTRIC MACHINES

Original Filed Sept. 28, 1925

Inventor:
Vladimir Karapetoff,
by
His Attorney.

Patented Oct. 25, 1927.

1,646,823

UNITED STATES PATENT OFFICE.

VLADIMIR KARAPETOFF, OF ITHACA, NEW YORK, ASSIGNOR TO GENERAL ELECTRIC COMPANY, A CORPORATION OF NEW YORK.

REGULATION OF DYNAMO-ELECTRIC MACHINES.

Application filed September 28, 1925, Serial No. 58,878. Renewed August 29, 1927.

My invention relates to the excitation of dynamo-electric machines and in particular to the excitation of synchronous dynamo-electric machines of the salient-pole type and has for its principal object the provision of an improved means whereby the voltage of an alternating-current machine may be maintained substantially constant irrespective of variations in the magnitude and phase of its load current, or if desired may be made to change under various load conditions for effecting any desired degree of compounding. A further object is the provision of an improved arrangement to effect substantially complete neutralization of the direct and transverse armature reaction in synchronous machines.

When a synchronous machine carries a load, either as a generator or as a motor, the armature currents, being sources of magnetomotive forces, modify and distort the flux created by the field coils, and thus influence the performance of the machine. The traveling wave of the armature magnetomotive force may be resolved into two waves, one whose crests coincide with the center lines of the poles, the other displaced 90 electrical degrees with respect to it. The first component of the armature magnetomotive force produces only a "direct" effect upon the field flux, that is, it either strengthens or weakens the flux without distorting it. This effect of the armature current is called the direct armature reaction. The second component of the armature magnetomotive force produces a "transverse" action, namely, it shifts the flux toward one or the other pole tip, and may decrease the total flux if the pole tips become saturated. This effect of the armature current in distorting the field flux is called the transverse armature reaction.

These two kinds of armature reaction may be thought of as due to two components of the armature current, one which reaches its maximum value in time quadrature with the polar axes, namely when the corresponding group of armature conductors is midway between the centers of two poles, and the other which reaches its maximum value in time phase with the polar axes, namely, a quarter of a cycle earlier or later, that is, when the same group of conductors is under the pole centers. Merely increasing the alternator field current in the axis of the main pole, as is the usual result in compounded alternators, will not result in a complete neutralization of the armature reaction since the increase in excitation is applied in the axis of the direct reaction.

In accordance with my invention, improved means are provided for neutralizing both the direct and transverse armature reaction. Preferably, I accomplish this result by providing a neutralizing field in the axis of the respective armature reactions, varying substantially simultaneously with the variations in armature current. Compensating windings are placed on the field poles near the armature winding of the synchronous machine with one winding positioned to counteract the direct armature reaction and excited by a direct current proportional to that component of the armature current causing the direct reaction, and with another winding positioned to counteract the transverse armature reaction and excited by a direct current proportional to that component of the armature current causing the transverse reaction.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawing in which Fig. 1 is a diagrammatic representation of one embodiment of my invention as applied to a three-phase synchronous dynamo-electric machine, and Fig. 2 is an illustrative view showing a way in which the compensating windings may be arranged.

Figure 2:
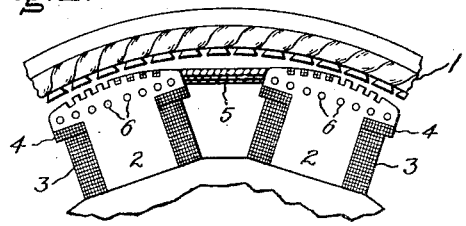

Referring to the drawing, in particular Fig. 2, 1 indicates the stator of a synchronous dynamo-electric machine, having a revolving field provided with salient poles. The field poles 2 are provided with a main field winding 3 positioned in the usual manner, a compensating winding 4 arranged coaxially with the main winding, and a compensating winding 5, placed in slots in the pole shoes and displaced 90 electrical degrees with respect to the windings 3 and 4. The number of turns of the windings 4 and 5 may be arranged to provide magnetomotive forces equal and opposite to the magnetomotive forces resulting from the components of the armature current causing the direct and transverse reactions respectively, or they may be in excess, so as to compensate for the impedance drop in the armature and, if desired, to provide for over-compounding. The usual amortisseur winding may be placed in holes 6 below the winding 5 or placed in alternate slots in the pole shoes.

In Fig. 1, an illustrative arrangement embodying my invention is shown in connection with a three-phase alternator having a stator winding 7 supplying an electric circuit, such as a transmission line 8. The field windings 3, 4, and 5, positioned on the rotor of the alternator in the manner hereinbefore described, are connected to the rotor slip rings, 9 and 12, 10 and 12, and 10 and 11 respectively, carried on the shaft 13 of the alternator. The slip rings are connected by means of stationary brushes 14, 15, 16 and 17 with the exciting circuits for the field windings 3, 4, and 5. The field winding 3 is connected to a direct-current exciter 18 through slip rings 9 and 12, and brushes 14 and 17. The exciter 18 is provided with a field winding 19 having an adjustable resistance 20 interposed in series therewith, and an adjustable resistance 21 in series with the mains leading to the brushes 14 and 17. A regulator 22 of the vibratory type is provided for the exciter 18 and may consist of the usual direct-current magnet 24 connected across the exciter mains and an alternating-current magnet 23 connected across the alternator terminals. The vibrations of the magnets 23 and 24 may be arranged to open and close the contact 25 in a shunt circuit around the resistance 20, to alternately short circuit and insert the resistance 20, in the exciter field 19 in a manner well understood.

The direct current for the compensating windings 4 and 5 is obtained from suitable rectifiers, for example, of the electron discharge type, and shown as three-phase mercury-vapor rectifiers 26 and 33. The mercury-vapor rectifier 26 is provided with anodes 28, 29, and 30, a cathode 27, and a starting switch 31 and battery 32; the mercury-vapor rectifier 33 is provided with anodes 35, 36 and 37, a cathode 34, and a starting switch 38 and battery 39. Devices 40 and 43, referred to herein as "inductance modifiers", are provided to furnish the alternating-current excitation for the mercury-vapor rectifiers. The inductance modifier 40 comprises a rotor 41 of magnetic material provided with polar projections, but no windings, mounted on the shaft 13 of the main alternator. If the rotor is provided with the same number of poles as the alternator, it may be directly coupled to the alternator shaft, otherwise, it may be connected through gearing or rotated in such a way that electrical phase synchronism may be maintained between the alternator and the rotor of the inductance modifier. The stator structure 42' of the inductance modifier is provided with a three-phase winding 42, which is shown below the stator structure 42' for simplicity of illustration, and is arranged in the usual way to provide a gliding magnetomotive force. In like manner, inductance modifier 43 comprises a rotor 44 operated in synchronism with the main alternator and a stator 45' provided with a three-phase winding 45. The windings 42 and 45 are connected to the alternator mains 8 through series transformers 53, 54, and 55. The alternating voltage obtained from the terminals 46, 47, and 48 of the winding 42 is applied to the anodes 28, 29, and 30 of the mercury-vapor rectifier 26. The cathode 27 and the midpoint 49 of the winding 42 are connected through brushes 15 and 17, cooperating with slip rings 10 and 12, to the compensating winding 4. In like manner, the alternating voltage obtained from the terminals 50, 51, and 52 of the winding 45 is applied to the anodes 35, 36, and 37 of the mercury-vapor rectifier 33. The cathode 34 and the midpoint 49 of the winding 45 are connected through brushes 15 and 16, cooperating with slip rings 10 and 11, to the compensating winding 5.

The mode of operation of the arrangement shown in Fig. 1 is as follows:—Assume the alternator is brought up to speed by a suitable prime mover (not shown) and is excited by means of the main field winding 3 energized by the exciter 18. The no-load voltage may be adjusted by the adjustable resistance 21 in cooperation with the resistance 20 in the exciter field. As soon as load current is taken from the alternator, the operation of the devices 26 and 33 will be initiated by means of the starting switches 31 and 38, and a direct-current voltage will be applied to the compensating windings 4 and 5. The stator winding 42 of the inductance modifier 40 is excited from the alternator mains and the excitation thereof will produce a gliding magnetomotive force proportional to the main alternating current. The flux due to this magnetomotive force depends upon the position of revolving polar projections of the rotor 41. When these projections are opposite the crest of the magnetomotive force wave, the flux is a maximum and so is the voltage at the terminals of the winding 42. When the recesses between the polar projections of the rotor 41 are opposite the crest point of the magnetomotive force wave, the flux is a minimum and so is the voltage across the terminals of the winding 42. In like manner, the same reasoning applies to the device 43 and the voltages across the terminals of the windings 45. Since the rotors 41 and 44 are driven from the alternator shaft and the magnetomotive forces of their respective stators are created by the main current, the relative position of the gliding magnetomotive force and of the polar projections depends upon the time angle between the maximum value of the armature current and the center of the alternator poles. The rotor 41 is so mounted that the inductance of the winding 42 is a maximum when the time angle equals 90 electrical degrees and the rotor 44 is set at 90 electrical degrees from the rotor 41. Thus with a non-inductive current with respect to the pole centers, the device 33 is subjected to a maximum voltage and consequently the winding 5 receives a large current; with a purely inductive current, the device 26 is subjected to a maximum voltage resulting in a large current in the winding 4, thus strengthening the compensation for the direct armature reaction. In a particular case it may be found desirable to adjust the displacement angle between the rotors in order to obtain some special desired excitation for the windings 4 and 5.

Any tendency for overcompensation will be taken care of by the regulator 22, which will control the excitation in the field windings 3 in a manner well known, and thus maintain the voltage of the alternator at a desired value under steady load conditions within the values of output current and power factor that may actually occur. Under sudden overloads the capacity of synchronous machines will be increased in view of the fact that the arrangement herein disclosed is intrinsic and operates substantially instantaneously with a change in armature current.

While I have shown and described a particular embodiment of my invention as applied to an alternating-current generator, it will be apparent to those skilled in the art that it is applicable to other synchronous dynamo-electric machines, such as a synchronous motor, and I, therefore, aim in the appended claims to cover all such changes and modifications as fall within the true spirit and scope of my invention.

What I claim as new and desire to secure by Letters Patent of the United States is:—

1. The combination of an alternating-current dynamo-electric machine provided with a main field winding and an auxiliary field winding, means for energizing said main field winding, means for producing an alternating voltage varying substantially as that component of the armature current which reaches its maximum value in time quadrature with the polar axes of said main field winding, and means for rectifying said alternating voltage wherewith the auxiliary field excitation of said alternating current machine may be varied.

2. The combination of an alternating-current dynamo-electric machine provided with a main field winding and an auxiliary field winding, means for energizing said main field winding, means for producing an alternating voltage varying substantially as that component of the armature current which reaches its maximum value in time phase with the polar axes of said main field winding, and means for rectifying said alternating voltage wherewith the auxiliary field excitation of said alternating current machine may be varied.

3. The combination of an alternating-current dynamo-electric machine provided with a main field winding and auxiliary field windings, mean for energizing said main field winding, means for producing alternating voltages one of which varies substantially as that component of the armature current which reaches its maximum in time quadrature with the polar axes of said main field winding and another of which varies substantially as that component of the armature current which reaches its maximum in time phase with the polar axes of said main field winding, and means for rectifying said alternating voltages wherewith the auxiliary field excitation of said alternating-current machine may be varied.

4. The combination of an alternating-current dynamo-electric machine with a main field winding and an auxiliary field winding, means for energizing said main field winding, an alternating-current winding energized from said alternating-current machine for producing a gliding magnetomotive force proportional to the armature current of said alternating-current machine, a rotor of magnetic material with polar projections associated with said alternating-current winding and arranged to be rotated in synchronism with said alternating-current machine, and a rectifying device interconnecting said alternating-current winding and said auxiliary field winding for applying thereto a direct current varying in a manner to neutralize the direct armature reaction of said alternating-current machine.

5. The combination of an alternating-current dynamo-electric machine provided with a main field winding and an auxiliary field winding, means for energizing said main field winding, an alternating-current winding energized from said alternating-current machine for producing a gliding magnetomotive force proportional to the armature current of said alternating-current machine, a rotor of magnetic material with polar projections associated with said alternating-current winding and arranged to be rotated in synchronism with said alternating current machine, and a rectifying device interconnecting said alternating-current winding and said auxiliary field winding for applying thereto a direct current varying in a manner to neutralize the transverse armature reaction of said alternating-current machine.

6. The combination of an alternating-current dynamo-electric machine provided with a main field winding and auxiliary field windings, means for energizing said main field winding, alternating-current windings energized from said alternating-current machine for producing a gliding magnetomotive force proportional to the armature current of said alternating-current machine, rotors of magnetic material with polar projections associated with said alternating-current windings and arranged to be rotated in synchronism with said alternating-current machine, and rectifying means interconnecting said alternating current windings and said auxiliary field windings for applying thereto a direct current varying in a manner to neutralize the direct and transverse armature reaction of said alternating-current machine.

7. The combination of an alternating-current dynamo-electric machine provided with a main field winding and auxiliary field windings, an exciter connected to said main field winding, means for adjusting the excitation of said exciter in response to variations in the voltage of said alternating-current machine, alternating current windings energized by said alternating-current machine for producing a gliding magnetomotive force proportional to the armature current of said alternating-current machine, rotors of magnetic material with polar projections associated with said alternating-current windings and arranged to be rotated in synchronism with said alternating-current machine, and rectifying means interconnecting said alternating-current windings and said auxiliary field windings for applying thereto a direct current varying in a manner to neutralize the direct and transverse armature reaction of said alternating-current machine.

8. The combination of an alternating-current dynamo-electric machine provided with a main field winding, a direct-current exciter connected to said main field winding, an auxiliary field winding arranged coaxially with said main field winding, a polyphase winding arranged to be energized in accordance with the armature current of said alternating-current machine, a rotor of magnetic material with polar projections arranged to be operated in synchronism with said alternating-current machine for varying the alternating voltage of said polyphase winding in accordance with the variations in that component of the armature current causing a direct armature reaction in said alternating-current machine, and an electron discharge device interconnecting said polyphase winding and said auxiliary field winding.

9. The combination of an alternating-current dynamo-electric machine provided with a main field winding, a direct-current exciter connected to said main field winding, an auxiliary field winding displaced 90 electrical degrees from the polar axis of said main field winding, a polyphase winding arranged to be energized in accordance with the armature current of said alternating-current machine, a rotor of magnetic material with polar projections arranged to be operated in synchronism with said alternating-current machine for varying the alternating voltage of said polyphase windings in accordance with the variations in that component of the armature current causing a transverse armature reaction in said alternating-current machine, and an electron discharge device interconnecting said polyphase winding and said auxiliary field winding.

10. The combination of an alternating-current dynamo-electric machine provided with a main field winding, a direct-current exciter connected to said main field winding, an auxiliary field winding arranged coaxially with said main field windings, a second auxiliary field winding displaced 90 electrical degrees from the polar axis of said main field winding, two polyphase circuits arranged to be energized in accordance with the armature current of said alternating-current machine, a rotor of magnetic material with polar projections associated with one of said polyphase circuits and arranged to be operated in synchronism with said alternating-current machine for varying the alternating voltage from said polyphase circuit in accordance with the variations in that component of the armature current causing a direct armature reaction in said alternating-current machine, an electron discharge device interconnecting said polyphase circuit and said first mentioned auxiliary field winding, a rotor of magnetic material associated with the other of said polyphase circuits and arranged to be operated in synchronism with said alternating current machine for varying the alternating voltage from said polyphase circuit in accordance with the variations in that component of the armature current causing a transverse reaction in said alternating-current machine, and an electron discharge device interconnecting said second mentioned polyphase circuit and said second mentioned auxiliary field winding.

11. The combination of an alternating-current dynamo-electric machine provided with a main field winding, a direct current exciter connected to said main field winding, means for adjusting the excitation of said exciter in response to variations in the voltage of said alternating-current machine, an auxiliary field winding arranged coaxially with said main field winding, a second auxiliary field winding displaced 90 electrical degrees from the polar axis of said main field winding, two polyphase circuits arranged to be energized in accordance with the armature current of said alternating-current machine, a rotor of magnetic material with polar projections associated with one of said polyphase circuits and arranged to be operated in synchronism with said alternating-current machine, a rotor of magnetic material with polar projections displaced 90 electrical degrees with respect to said first rotor associated with the other of said polyphase circuits and arranged to be operated in synchronism with said alternating-current machine, a mercury-vapor rectifier interconnecting said first mentioned polyphase circuit and said first mentioned auxiliary field winding, and a mercury-vapor rectifier interconnecting said second mentioned polyphase circuit and said second auxiliary field winding.

In witness whereof, I have hereunto set my hand this 25th day of September, 1925.

VLADIMIR KARAPETOFF.